United States Patent
King (10) Patent No.: US 6,457,176 B1
(45) Date of Patent: Sep. 24, 2002

(54) SYSTEM AND METHOD FOR SOURCE CODE PROCESSING

(75) Inventor: Robert L. King, Vestal, NY (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/344,577

(22) Filed: Jun. 25, 1999

(51) Int. Cl.⁷ .................................................. G06F 9/45
(52) U.S. Cl. ...................................................... 717/173
(58) Field of Search ................................ 717/168, 169, 717/171–173, 176–178; 709/220–222

(56) References Cited

U.S. PATENT DOCUMENTS

| | | | | |
|---|---|---|---|---|
| 5,442,791 A | * | 8/1995 | Wrabetz et al. | 709/104 |
| 5,813,007 A | * | 9/1998 | Nielsen | 707/10 |
| 5,832,520 A | * | 11/1998 | Miller | 707/203 |
| 5,910,981 A | * | 6/1999 | Bhagat et al. | 379/219 |
| 5,961,582 A | * | 10/1999 | Gaines | 709/1 |
| 6,279,151 B1 | * | 8/2001 | Breslau et al. | 717/6 |

OTHER PUBLICATIONS

Colnet et al., Compiler Support to Customize the Mark and Sweep Algorithm, 1998, ACM, pp. 154–165.*
Smith et al., Comparing Mostly–Copying and Mark–Sweep Conservative Collection, 1998, ACM, pp. 68–78.*

* cited by examiner

Primary Examiner—Gregory Morse
Assistant Examiner—John Q. Chavis
(74) Attorney, Agent, or Firm—Shelley M Beckstrand (57) ABSTRACT

A host system and a local system (work station) comprise a system for updating source code. The host system includes a compiler and any necessary tools for compilation of source code which is characterized by, for example, database statements. While the work station also includes a compiler, it lacks tools for translating the database statements. Consequently, the host system expands and marks the original source to create a marked expanded source file which is in a form compilable at work station without the tools. The work station then modifies the source file, and returns a processed source file to the host system, where the marking and preprocessing are undone and the source file returned to its original form (but now as changed by the work station).

15 Claims, 7 Drawing Sheets

SYSTEM AND METHOD FOR SOURCE CODE PROCESSING

BACKGROUND OF THE INVENTION

1. Technical Field of the Invention

This invention pertains source code processing. More particularly, it pertains to changing and compiling software source code when required processors are not locally available.

2. Background Art

More and more often companies are using workstations or remote mainframes to change or maintain mainframe (or host) software source code. Very often, the software source code must be processed by several programming language processors in sequence. For example, a set of programs may have to be processed by a database processor, such as IDMS or AdaBase, then by an on-line processor, such as CICS, and then by a programming language compiler, such as Cobol or PL/1.

Frequently, the language compiler is available on a workstation or remote mainframe but not all other required processors or tools, also referred to as preprocessors. This may be because the preprocessor does not operate in the environment of the workstation or remote mainframe, or is a dialectical variant, or because of licensing costs.

When making changes to software source code, it is very desirable, and usually a requirement, that the organization making the changes be able to at least completely compile the changed source code. This is a problem if that organization executes its work at a remote mainframe or workstation which does not include the required preprocessors.

The usual solution is to not compile source code which has been changed at a remote location (such as a work station or remote mainframe) until the changed source code has been returned to the host system (or local main frame, where the required preprocessors reside). This introduces additional change cycles as errors detected by compilation are fixed. If some quick link can be established between the local and remote systems, the remote system can submit compilations to the home system the process of changing the source code works quite well. However, this approach can be quite expensive and may also have usability and turn around time problems due to security gateways and differing protocols. There is, therefore, a need in the art for a system and method which allows remote compilation of source code during the change phase, and to do so in such a way that the resulting changed source code can be restored to a form which is usable at the host.

It is an object of the invention to provide an improved system and method for changing source code.

It is a further object of the invention to provide an improved system and method for allowing remote compilations during source code change phase.

It is a further object of the invention to provide a system and method for allowing remote compilations during source code change phase, where those compilations are no more difficult than local compilations.

It is a further object of the invention to provide a system and method for changing and compiling source code at a remote station which does not have required preprocessors.

It is a further object of the invention to provide a system and method for processing source code which is compilable at both local and remote locations, with required preprocessing tools available only at the local location.

It is a further object of the invention to provide a system and method for updating or processing source code at a remote location which has been preprocessed into a form which can be compiled at the remote location and returning remotely updated or processed source code to the local location in a form.

SUMMARY OF THE INVENTION

In accordance with the invention, a method is provided for updating a language source file. The source file is expanded and marked to form an expanded marked source file compilable without reference to a tools source file. The expanded marked source file is then modified to form a modified expanded marked source file. Then, the modified expanded marked source file is unmarked and unexpanded to form a modified source file compilable with reference to the tools source file.

In accordance with an aspect of the invention, there is provided a computer program product configured to be operable for updating a language source file according to the steps of expanding, marking, modifying, unmarking and unexpanding the source file.

Other features and advantages of this invention will become apparent from the following detailed description of the presently preferred embodiment of the invention, taken in conjunction with the accompanying drawings.

BEST MODE FOR CARRYING OUT THE INVENTION

In accordance with the invention, required preprocessing is done and resulting source code, now in a compilable form without use of tools resident only at the local site, sent from a local site to a remote site (workstation or system), when it is expected that the preprocessor control code will not be changed. At the remote site, changes can be made, and during the change process the source code can be compiled as needed. The changed source code is then returned to the local or host site where the preprocessing is undone and the source code returned to its original state (except now modified by the changes made at the remote site).

For most embodiments of the invention, remote site and local site are relative and not limiting terms. Generally, in the following description if the tools files reside at one of the sites, they do not reside at the other site, and visa versa, and the language compiler resides at both sites.

A host system and a local system (work station) comprise a system for updating source code. The host system includes a compiler and any necessary tools for compilation of source code which is characterized by, for example, database statements. While the work station also includes a compiler, it lacks tools for translating the database statements. Consequently, the host system expands and marks the original source to create a marked expanded source file which is in a form compilable at work station without the tools. The work station then modifies the source file, and returns a processed source file to the host system, where the marking and preprocessing are undone and the source file returned to its original form (but now as changed by the work station).

Examples of changes made in this manner include Y2K conversions and upgrading COBOL code from one version to another.

The preprocessing which occurs at the host site includes taking out of the source code extra language features. This is done in a way that those features can be restored during undoing of preprocessing. Examples of such extra language features are (1) library systems in ENDEAVOR, PANVA-LET and LIBRARIAN (all of which have the ability to do "include" statements, but in a syntax not part of the COBOL language and thus not compilable by COBOL), and (2) database languages such as IDMS, SUPRA, ADABASE and others (all of which have languages which look like COBOL but must be translated into COBOL using translation tools provided by database providers).

Figure 1:
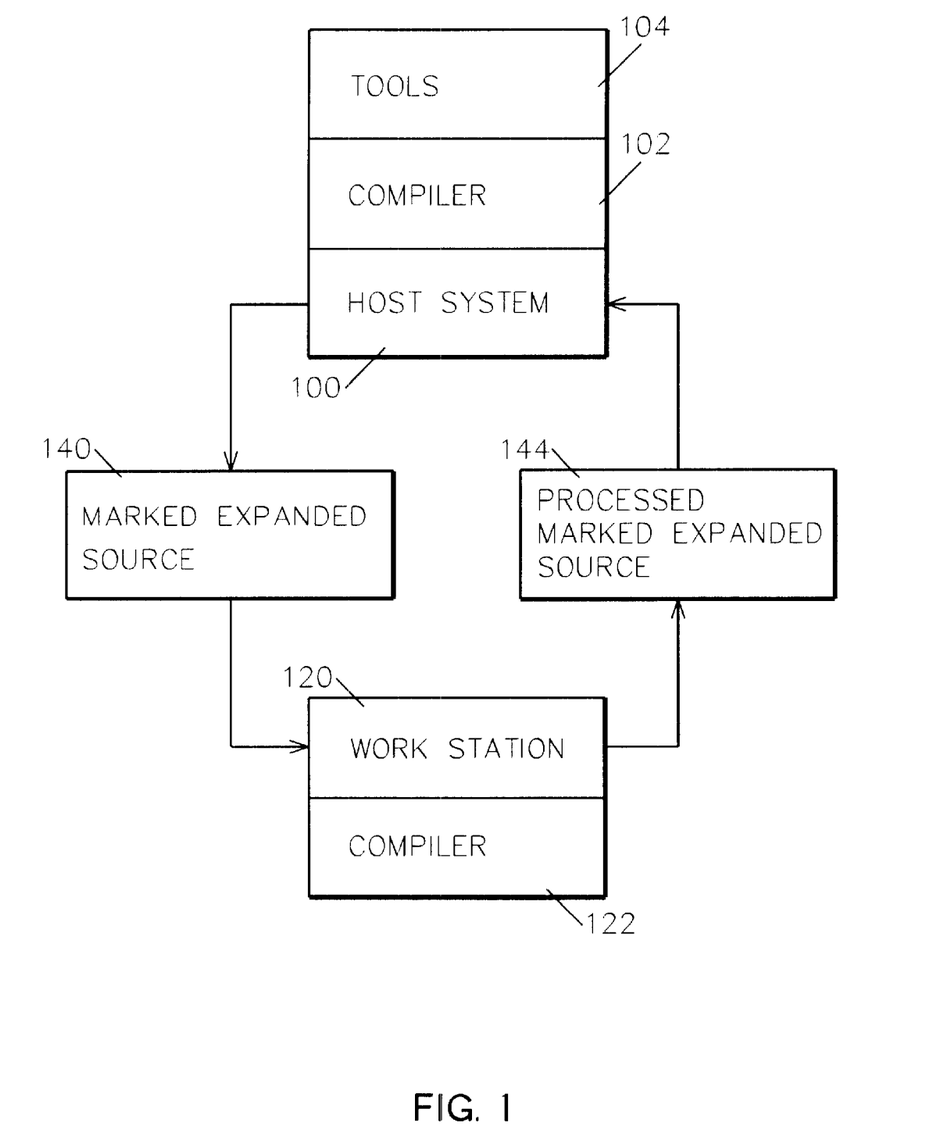
FIG. 1 illustrates the system of the invention.

Referring to FIG. 1, host system 100 (also referred to as a local system) and work station 120 (also referred to as a remote system) together comprise the system of the invention. Host system 100 includes a compiler 102 and any necessary tools 104 for compilation of source code which is characterized by, for example, include statements. While work station 120 also includes a compiler 122, it lacks these necessary tools 104. Consequently, in accordance with the invention, host system 100 expands and marks the original source to create a marked expanded source file 140 which is in a form compilable at work station 120 without tools 104. Work station 120 then works with the source file 140, and returns a processed source file 144 to host system 100, where the marking and preprocessing are undone and the source file returned to its original form (now as changed by work station 120).

Figure 2:
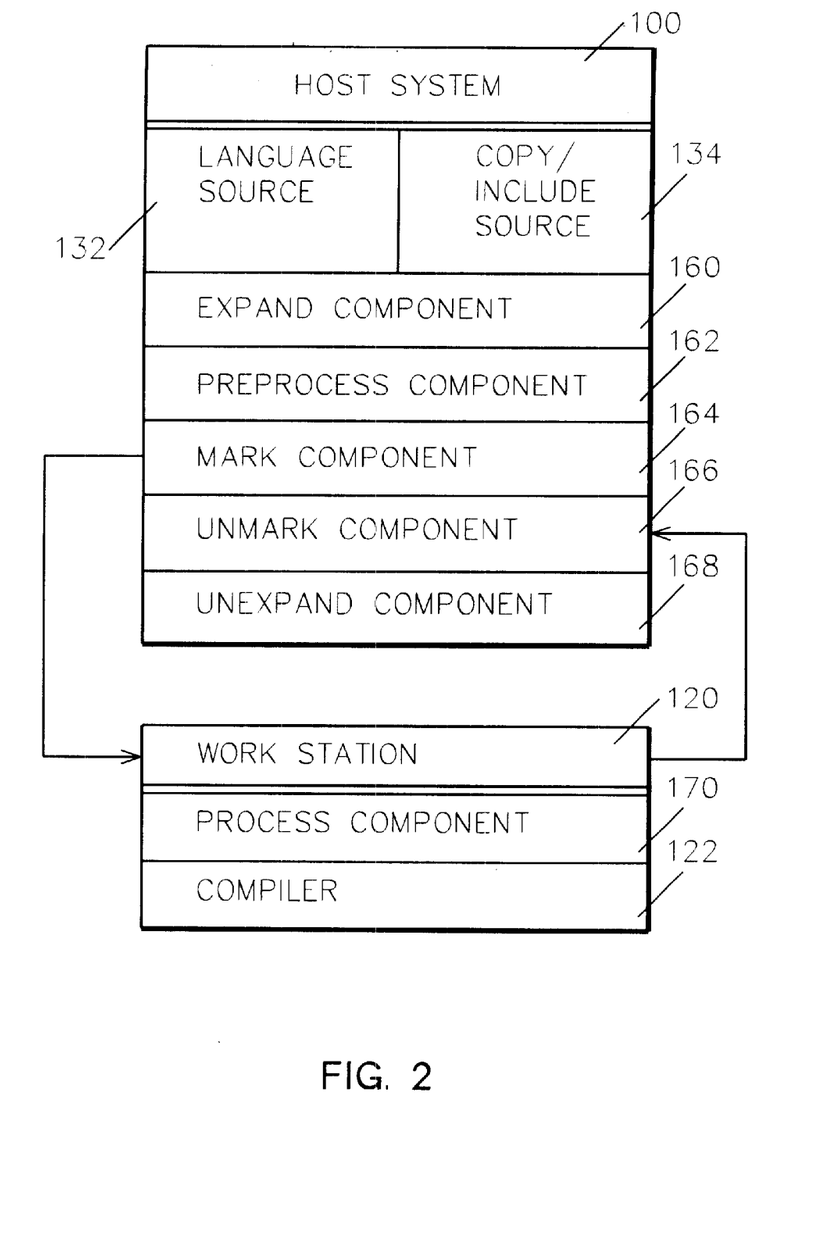
FIG. 2 illustrates the system of the invention, including the components or structures (such as logic, code procedures, objects, routines or the like) for executing the method of the invention.

Referring to FIG. 2, the system components required at host system 100 and workstation 120 to work with the source code 132 are illustrated. These include copy/include source 134, expand component 160, preprocess component 162, mark component 164, process component 170, unmark component 166 and unexpand component 168.

Figure 3:
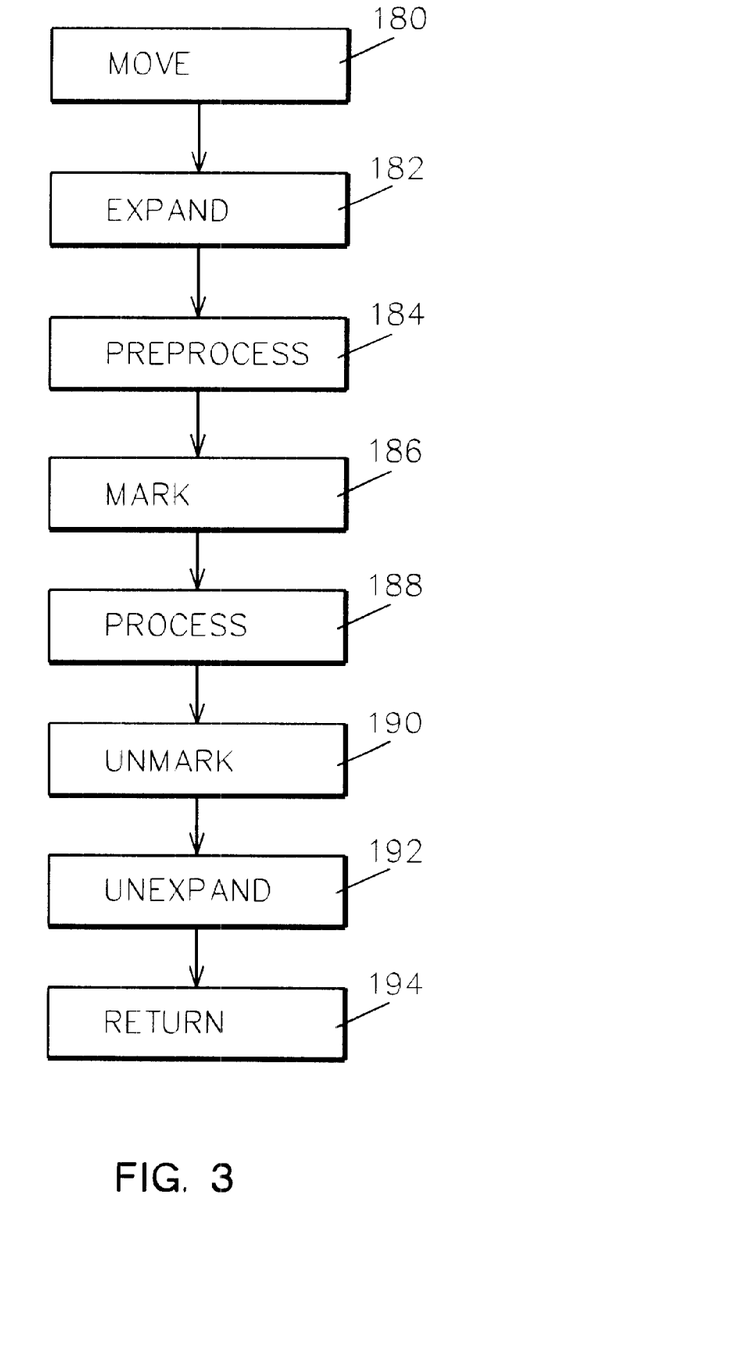
FIG. 3 illustrates the method steps of the invention.

Referring to FIG. 3, these components (illustrated in FIG. 2) execute the process steps of move 180, expand 182, preprocess 184, mark 186, process 188, unmark 190, unexpand 192, and return 194.

In step 180, source code files 132 and include and copy files 134 are moved to separate libraries (such as MVS libraries—PDSs).

In step 182, if any include files (-inc, ++include syntax) in source code 132 contain preprocessor code, the include statements are expanded into the source code using special comments for each expansion to distinguish what include file was expanded, and from where, to create a set of expanded source files.

In step 184, the expanded source files are preprocessed as necessary to create a set of expanded, preprocessed source files.

In step 186, the set of expanded, preprocessed source files from step 184 are compared to the expanded source files from step 182, file by file, line by line, and marked to create a set of marked source files. The marks are special comments that distinguish the code as follows: (a) source statements that appear in both the expanded and expanded, preprocessed files are not marked; (b) source statements that appear only in the expanded source files are marked as preprocessor source code; and (c) source statements that appear only in the expanded, preprocessed source files are marked as preprocessor generated code. The preprocessor source code is included in the marked source files as comments, with all original values saved. The preprocessor generated code is included in the marked source files as comments, with all original values saved. Thus, the marked source file from step 186 includes (a) the expanded include files, (b) the preprocessor generated code, (c) the preprocessor source code as comments, and (d) the preprocessor generated code as comments.

In step 188, the marked source files from step 186 may be processed at work station 120, and are compilable by compiler 122.

In step 190, when all processing at work station 120 is complete, the resulting source files are unmarked, as follows. Source code from process 188 marked as preprocessor generated code, which is (b) in step 186 above, is compared to the preprocessor generated code from step 184, which is (d) in step 186 above. If there is no difference, both are discarded and the saved preprocessor source code, which is (c) in step 186 above, is restored. If there is a difference, an error log is produced, the saved preprocessor is not restored, and the source file is sent to an error library for manual processing and correction.

In step 192, the unmarked source files are unexpanded as follows: (a) the first time an expanded include file is encountered in the source code, its include statement is restored, and the expanded include code is copied to a library (such as an MVS library) and removed from the source file; (b) if an expanded include file's code compares identically with the code for that include in the library (in step (a)), its include statement is restored and the code removed from the source file; and (c) if an expanded include file's code does not compare identically, an error log is produced and the include statement is not restored. The files in this library are the include/copy files resulting from the process 188.

In step 194, when all errors have been resolved, the source code and include files replace the original files 132 and 134 respectively.

Tables 1–6 set forth examples of several COBOL source code lines at various stages in processing. Table 1 illustrates an example of original source code 132. Table 2 illustrates the source code after expand 182, with include statements expanded. Table 3 illustrates the source code after preprocess 184. Table 4 illustrates the source code after mark 186, at which stage it is in the form of marked expanded source code 140 for processing and compilation at the workstation or remote system 120 to generate processed marked expanded source 144. Table 5 illustrates the source code after unmark 190. Table 6 illustrates the source code after unexpand 192, at which stage the effects of expand 182 and mark 186 have been removed or reversed, and the source code returned to a from usable at the local or host system 100.

TABLE 1

SOURCE CODE BEFORE EXPAND

PROCEDURE DIVISION.
P000-MAIN.
    PERFORM P020-SETUP THRU P020-EXIT

TABLE 1-continued

SOURCE CODE BEFORE EXPAND

```
-INC R47000TD
    MOVE ZURRENT-DATE TO CUR-DTE-FORM.
    OBTAIN FIRST AGREE-REC WITHIN AGREE-AREAS.
    IF DB-END-OF-SET
```

TABLE 2

SOURCE CODE AFTER EXPAND BEFORE PREPROCESS

```
    PROCEDURE DIVISION.
    P000-MAIN.
        PERFORM P020-SETUP THRU P020-EXIT.
EXPB01*-R47000TD '4-'
*INC R*7000TD
        ACCEPT Z-YYMMDD FROM DATE.
        MOVE Z-YYY TO Z-YY.
        MOVE Z-MMM TO Z-MM.
        MOVE Z-DDD TO Z-DD.
EXPE01*-R4700TD 'Y2K.IBM.INCLUDE.MEMBERS'
        MOVE ZURRENT-DATE TO CUR-DTE-FORM.
        OBTAIN FIRST AGREE-REC WITHIN AGREE-AREAS.
        IF DB-END-OF-SET
```

TABLE 3

SOURCE CODE AFTER PREPROCESS

```
    PROCEDURE DIVISION.
    P000-MAIN.
        PERFORM P020-SETUP THRU P020-EXIT.
EXPB01*-R47000TD '4-'
*INC R*7000TD
        ACCEPT Z-YYMMDD FROM DATE.
        MOVE Z-YYY TO Z-YY.
        MOVE Z-MMM TO Z-MM.
        MOVE Z-DDD TO Z-DD.
EXPE01*-R4700TD 'Y2K.IBM.INCLUDE.MEMBERS'
        MOVE ZURRENT-DATE TO CUR-DTE-FORM.
    *   OBTAIN FIRST AGREE-REC WITHIN AGREE-AREAS.
            MOVE 0001 TO DML-SEQUENCE
            CALL 'IDMS' USING SUBSCHEMA-CTRL
                IDBMSCOM (19)
                SR481
                AGREE-AREAS
                IDBMSCOM (43).
        IF DB-END-OF-SET
```

TABLE 4

SOURCE CODE AFTER MARK

```
    PROCEDURE DIVISION.
    P000-MAIN.
        PERFORM P020-SETUP THRU P020-EXIT.
EXPB01*-R47000TD '4-'
*INC R*7000TD
        ACCEPT Z-YYMMDD FROM DATE.
        MOVE Z-YYY TO Z-YY.
        MOVE Z-MMM TO Z-MM.
        MOVE Z-DDD TO Z-DD.
EXPE01*-R4700TD 'Y2K.IBM.INCLUDE.MEMBERS'
        MOVE ZURRENT-DATE TO CUR-DTE-FORM.
MARKA *0001:
    *     OBTAIN FIRST AGREE-REC WITHIN AGREE-AREAS.
MARKB *0007:*
    *     OBTAIN FIRST AGREE-REC WITHIN AGREE-AREAS.
    *         MOVE 0001 TO DML-SEQUENCE
    *         CALL 'IDMS' USING SUBSCHEMA-CTRL
    *             IDBMSCOM (19)
    *             SR481
```

TABLE 4-continued

SOURCE CODE AFTER MARK

```
    *             AGREE-AREAS
    *             IDBMSCOM (43).
MARKD *0007
    *     OBTAIN FIRST AGREE-REC WITHIN AGREE-AREAS.
            MOVE 0001 TO DML-SEQUENCE
            CALL 'IDMS' USING SUBSCHEMA-CTRL
                IDBMSCOM (19)
                SR481
                AGREE-AREAS
                IDBMSCOM (43)
MARKE *
        IF DB-END-OF-SET
```

TABLE 5

SOURCE CODE AFTER UNMARK

```
    PROCEDURE DIVISION.
    P000-MAIN.
        PERFORM P020-SETUP THRU P020-EXIT.
EXPB01*- R47000TD '4-'
*INC R*7000TD
        ACCEPT Z-YYMMDD FROM DATE.
        MOVE Z-YYY TO Z-YY.
        MOVE Z-MMM TO Z-MM.
        MOVE Z-DDD TO Z-DD.
EXPE01*- R47000TD 'Y2K.IBM.INCLUDE.MEMBERS'
        MOVE ZURRENT-DATE TO CUR-DTE-FORM.
        OBTAIN FIRST AGREE-REC WITHIN AGREE-AREAS.
        IF DB-END-OF-SET
```

TABLE 6

SOURCE CODE AFTER UNEXPAND

```
    PROCEDURE DIVISION.
    P000-MAIN.
        PERFORM P020-SETUP THRU P020-EXIT.
-INC R47000TD
        MOVE ZURRENT-DATE TO CUR-DTE-FORM.
        OBTAIN FIRST AGREE-REC WITHIN AGREE-AREAS.
        IF DB-END-OF-SET
```

Figure 4:
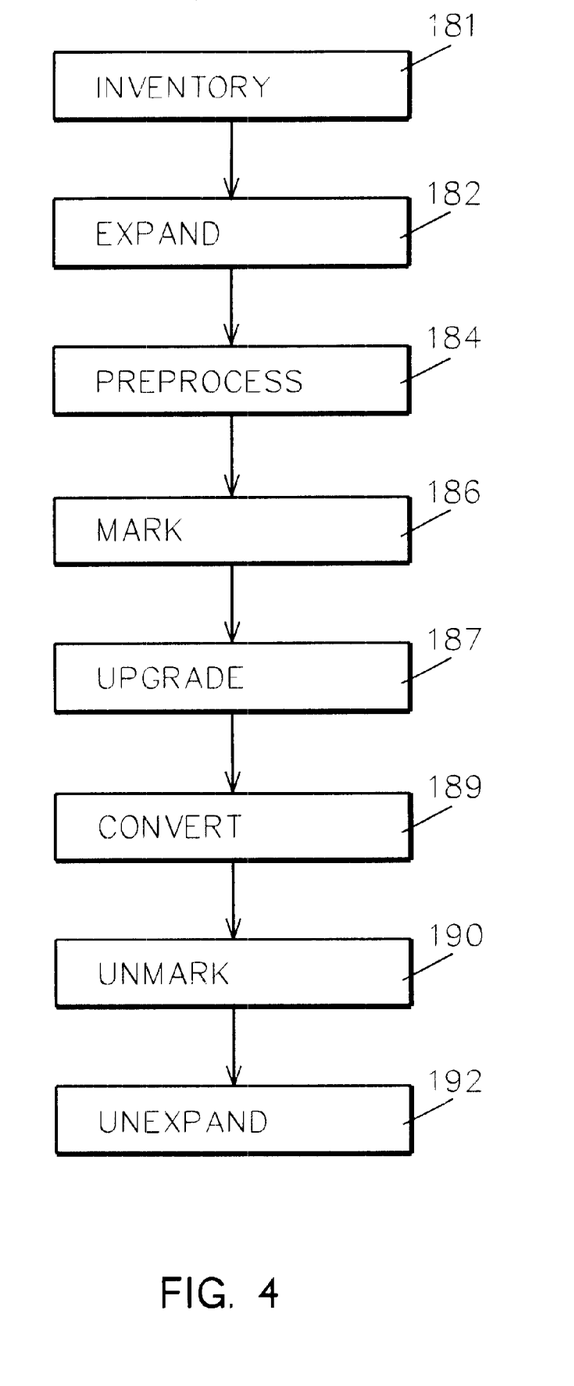
FIG. 4 illustrates the method steps of an exemplary embodiment of the invention.

Referring to FIG. 4, the process flow of FIG. 3 is expanded to illustrate a specific, exemplary embodiment involving transformation upgrade and Y2K conversion.

As illustrated in this example, preprocess component 160 is any preprocessor, translator, or precompiler (other than recent versions of DB2, CICS, and Report Writer.) Examples of preprocessor component 162 are IDMS and AdaBase (AdaPrep). Postprocessors, such as Capex or CA/Optimizer, do not affect the upgrade 187 or Y2K conversion 189 steps, and are not used.

The four utility programs that enable the preprocessor process of FIG. 4 are expand 160, mark 164, unmark 166 and unexpand 168. These utilities are implemented for this example as a set of tools for COBOL language upgrades and Year 2000 conversions of mainframe COBOL source code as MVS/TSO Rexx programs, the main and program specific subroutines of which are illustrated in Table 7 Expand, Table 8 Mark, Table 9 Unmark, and Table 10 Unexpand, respectively.

Expand 160 executes the expand step 182 to expand include statements (-inc, ++include) into the source and annotate the source so that unexpand 168 can restore the include statements.

Mark 164 executes the mark step 186 to find the differences between unpreprocessed and preprocessed source and annotate the preprocessed source so that the unmark utility 166 can restore the preprocessor language.

Unmark 166 executes unmark step 190 to find preprocessor generated code using the annotation provided by mark 164 and determine if the generated code was changed. If the generated code was not changed, the generated code is removed from the source and the preprocessor language restored. If the generated code was changed, programmers look at the code and handle it manually (this may indicate changes that should be made to the preprocessor language or because the preprocessor is generating unique code, such as unique OS/VS COBOL code).

Unexpand 168 executes unexpand step 192 to find each expansion of an include statement in the source using the annotation provided by expand utility 160, compare the expanded code in the source to the include file, and determine if it was changed the same way as all other expansions of that include file. If it was changed consistently, the expanded code becomes the new include file, is removed from the source, and the include statement is restored. If it has changed inconsistently, programmers look at the different changes and handle them manually (this is rare, but may validly indicate the need for more than one include file or that the code should be in-line).

In an alternative embodiment, mark utility 162, unmark utility 164, and unexpand utility 168 could be run at work station 120. This requires that the following sets of source files be sent to work station or system 120 from host system 100: (a) the inputs to the expand utility 160 (the original Cobol source 132 and include 134 files); (b) the output of the expand utility 160 (the expanded source), which is the input to preprocessor 162; and (c) the output of preprocessor 162 (the preprocessed expanded source).

Figure 5:
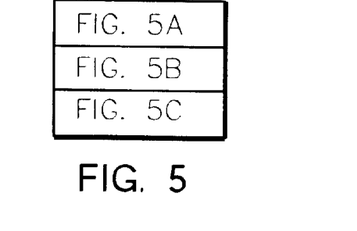
Figure 5A:
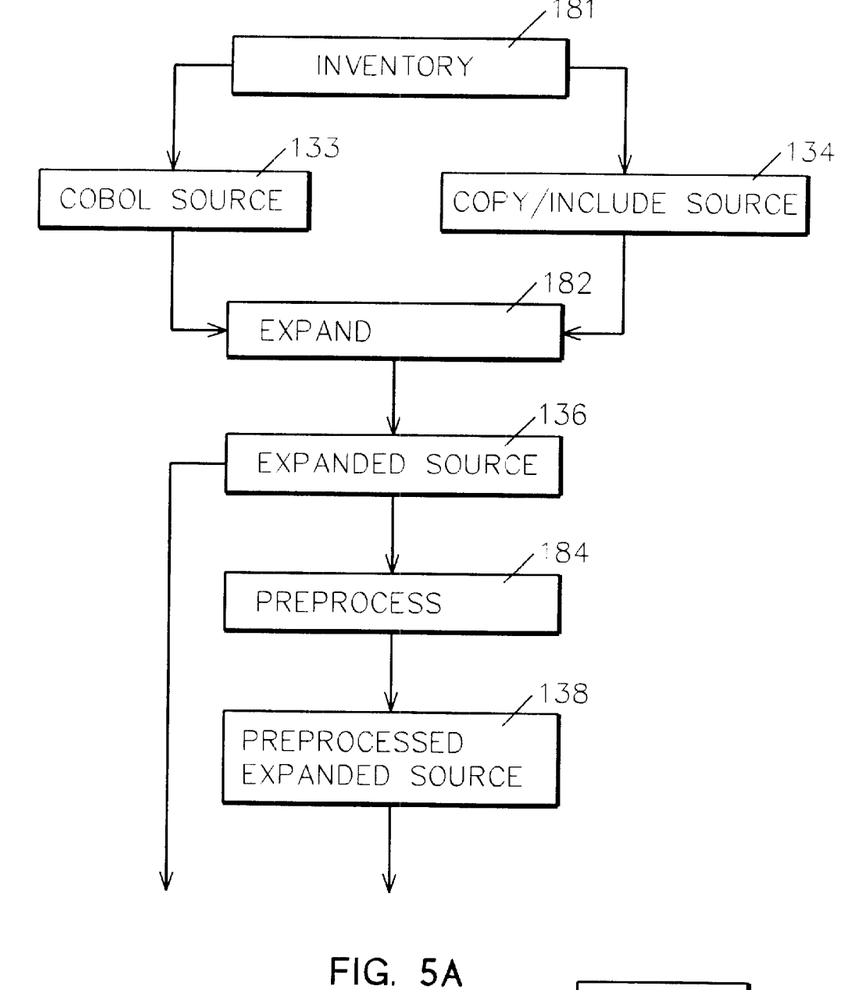
FIGS. 5A–5C, organized as illustrated in FIG. 5, illustrate in greater detail the method steps of the embodiment of FIG. 4.
Figure 5B:
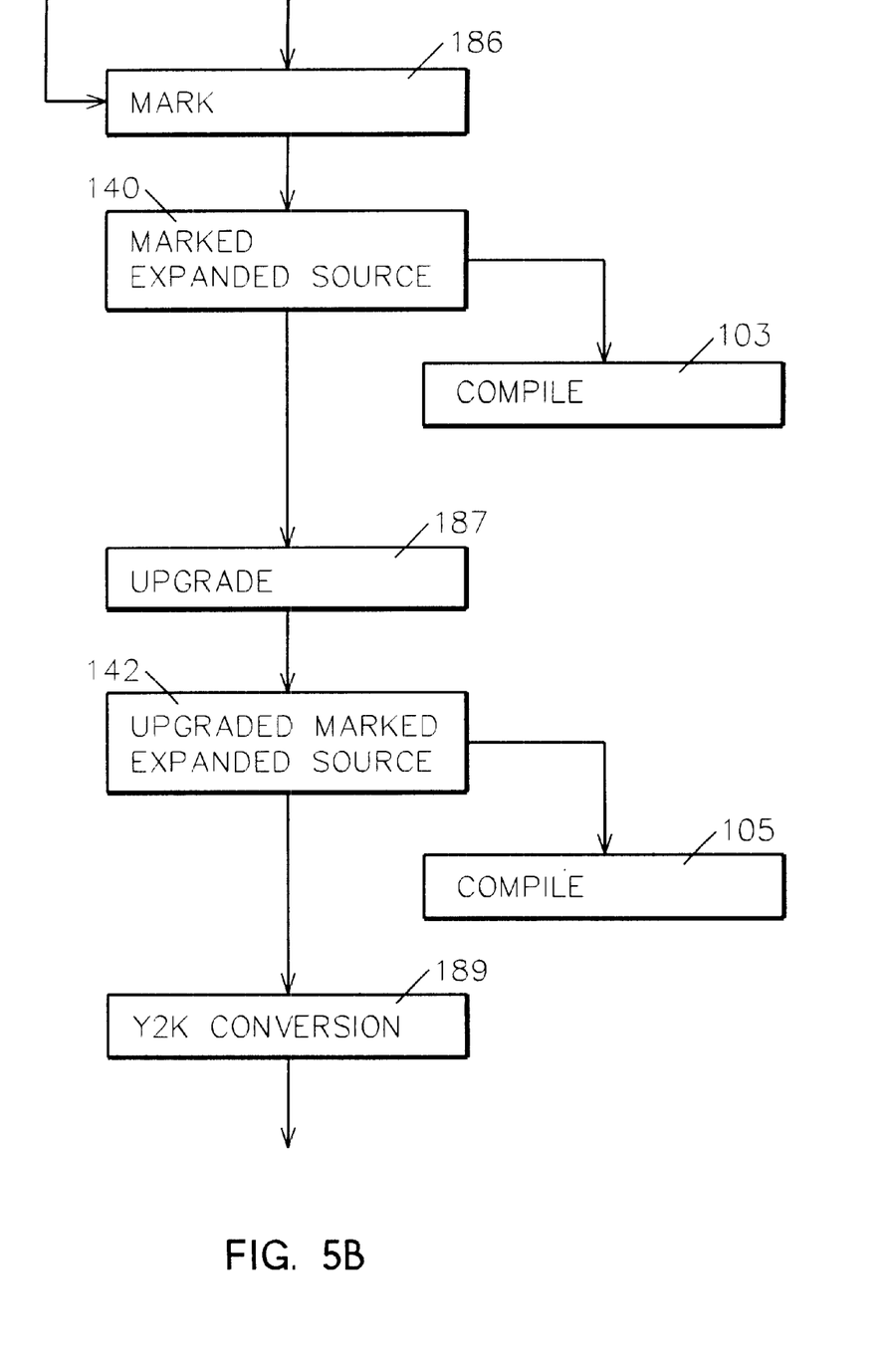
Figure 5C:
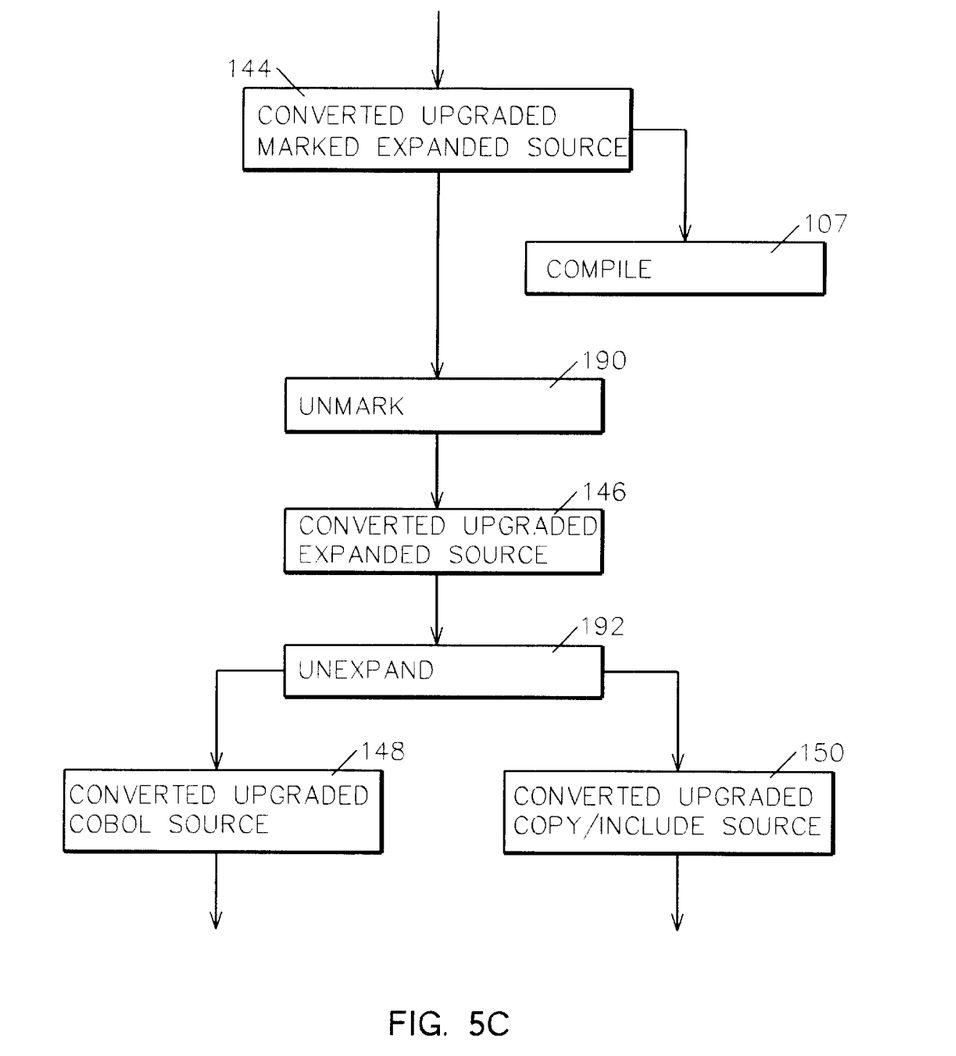

Referring now to FIG. 5, inventory 181 is the set of program and associated files to be processed. This is usually an "unload" from a source code library system.

As previously described, Cobol source 133 and copy/include source 134 files are expanded in step 182 to created expanded source files 136. These are preprocessed in step 184 to create preprocessed expanded source 138 and marked in step 186 to create marked expanded source files 140. This source file 140 is compilable without reference to copy/include source files 134, as is represented by compile 103, and it is in this form that the source file is sent to work station 120 for processing. In this specific embodiment, processing includes upgrade step 187 and Y2K conversion 189, the outputs of which are upgraded marked expanded source files 142 and converted upgraded marked expanded source files 144, respectively. In each case, as is represented by compiles 105 and 107, the resulting files are compilable locally (at work station 120) without recourse to copy/include source files 134 (at host system 100).

Processed marked expanded source 144, here referred to as converted upgraded marked expanded source, is in a form, as previously described, which can be returned to host system 100 and restored to the same form as language source 132 by unmarking and unexpanding.

Thus, in unmark step 190 converted upgraded expanded source files 146 are prepared, which in unexpand step 192 are unexpanded into converted upgraded Cobol source files 148 and converted upgraded copy/include source files 150.

In Tables 7–10, an exemplary embodiment of expand utility 160, mark utility 164, unmark utility 166 and unexpand utility 168 is set forth in REXX-like pseudo code.

TABLE 7

EXPAND UTILITY

```
/* REXX expand copy and include files into program           */
/* Input: InpLib -Programs with copy/include stmts to expand */
/* Inputs: CpyLib.n-Cobol copybook and include libraries     */
/* Output: OutLib -Programs with copies/includes expanded inline */
/* Output: OutCpy -Copybooks not expanded                    */
/* Output: RptLib -List of errors                            */
/* Annotations:                                              */
/* EXPBnn* Begin expansion for nesting level nn              */
/*   For -inc                                                */
/*     col 8                                                 */
/*     col 10–17 Member name                                 */
/*     col 19–22 Values from cols 7 and 1 in single quotes: '71' */
/*   For ++include                                           */
/*     col 8 +                                               */
/*     col 10–17 Member name                                 */
/*     col 19–22 Values from cols 7 and 8 in single quotes: '78' */
/*   For copy                                                */
/*     col 8 C                                               */
/*     col 10–17 Member name                                 */
/*     col 19–.. Values from cols 7 from each statement line: '777' */
/* EXPCnn Code added for nesting level nn that is not in copybook */
/* EXPEnn* End expansion for nesting level nn                */
/*     col 8 Type of include, as above                       */
/*     col 10–17 Member name                                 */
/*     col 19–62 Library data set name                       */
/* call to initalize variables                               */
/* call to get and validate arguments                        */
/* call to initalize report                                  */
/* call to get the names of the input library members        */
/* Process members */
do Mem = 1 to MemCount
  address TSO "NEWSTACK"
  /* call to add the input member to the stack */
  /* call to validate the output member name */
  /* Process the member */
  Nest = 0
  drop OutLine.
  Out = 0
  do while queued( ) > 0
    parse pull InpLine
    select
      when left(InpLine,7) = 'EXPE'right(Nest,2,'0')'*'
        then do
          Nest = Nest–1
          Out = Out+1
          OutLine.Out = InpLine
        end
      when left(InpLine,5) = '-INC'
        then do
          parse var InpLine '-INC' IncAfter IncComment 73.
          IncAfter = translate(strip(IncAfter),',',',')
          parse var IncAfter IncName IncSeq1 IncSeq2.
          call AddInc
        end
      when substr(InpLine,8,10) = '++INCLUDE'
        then do
          parse var InpLine. '++INCLUDE' ppIName ppIComment 73.
          if length(ppIName) > 8
            then do
              ppIName = GetppIMemName(ppIName)
            end
          call AddppInclude
        end
      when ( verify(substr(InpLine,7,1),'-D') = 0 & ,
            ( pos(' COPY ',substr(InpLine,8,72–6)) > 0|,
              substr(InpLine,7,6) = 'DCOPY') )
        then do
          if IsACopyStmt( )
            then do
              if IsASimpleCopy( )
                then do
                  /* call to add a simple copy */
                end
              else do
                /* call to put the copy member */
                /* call to add 'Complex copy statement' to error report */
                Out = Out+1
```

TABLE 7-continued

EXPAND UTILITY

```
            OutLine.Out = InpLine
          end
        end
      else do
        /* call to add 'Copy statement not found' to error report */
        Out = Out+1
        OutLine.Out = InpLine
      end
    end
  otherwise do
    Out = Out+1
    OutLine.Out = InpLine
  end
 end
end
Out = Out+1
OutLine.Out = ''
Out = Out-1
/* call to put the copy member */
address TSO "DELSTACK"
end
/* call to clean up for termination */
exit 0
/* Program specific subroutines */
AddInc:
/* call to find the copy member IncName */
if /* IncName not found */
 then do
   /* call to add IncName '-inc not found' to error report */
   Out = Out+1
   OutLine.Out = InpLine
   return
   end
Nest = Nest+1
Out = Out+1
OutLine.Out = "EXPB"right(Nest,2,'0')"*-" left(IncName,8),
        ""''"substr(InpLine,7,1)left(InpLine,1)"''"
Out = Out+1
OutLine.Out = '*'right(overlay('*',InpLine,7),length(InpLine)-1)
push 'EXPE'right(Nest,2,'0')'*-' left(IncName,8) CpyDSN
/* call to add the copy member to the stack */
return
AddppInclude:
/* call to find the copy member ppIName */
if /* ppIName not found */
  then do
    /* call to add ppIName '++include not found' to error report */
    Out = Out+1
    OutLine.Out = InpLine
    return
    end
Nest = Nest+1
Out = Out+1
OutLine.Out = "EXPB"right(Nest,2,'0')"*+" left(ppIName,8) ,
        ""''"substr(InpLine,7,2)"''"
Out = Out+1
OutLine.Out = overlay('**',InpLine,7)
push 'EXPE'right(Nest,2,'0')'*+' left(ppIName,8) CpyDSN
/* call to add the copy member to the stack */
return
GetppIMemName:
LongName = arg(1)
MemName = left(LongName,8)
return MemName
IsACopyStmt:
CLine = ' ' substr(InpLine,8,72)' '
CBeg = -4
doforever
 CBeg = pos(' COPY ',CLine,CBeg+5)
 if CBeg = 0
  then return 0
 CpyBefore = left(CLine,CBeg-1)
 if InALiteral(CpyBefore)
  then iterate
 CpyAfter = right(CLine,length(CLine)-(CBeg+6)-1)
 parse var CpyAfter CpyName CpyAfter
 if CpyName == 'IDMS'
  then iterate
 if right(CpyName,1) = '.'
  then do
    CpyName = left(CpyName,length(CpyName)-1)
    CpyAfter = '.'CpyAfter
    end
 CpyName = strip(strip(strip(CpyName,'b','"'),'b','"'))
 if CpyName = ''
  then iterate
 CpyMemName = translate(strip(left(CpyName,8)))
 if verify(CpyMemName,
   'ABCDEFGHIJKLMNOPQRSTUVWXYZ$#@0123456789-') > 0
  then iterate
  end
 CpyMem = translate(CpyMemName,'0','-')
 CpyMem =
   overlay(translate(left(CpyMem,1),'ABCDEFGHIJ','1234567890'), ,
           CpyMem)
 return 1
InALiteral:
parse arg Text
P = min(pos('"',Text),pos("'",Text))
if P = 0
 then return 0
Delim = substr(Text,P,1)
do C = 1 by 1 until P = 0
 P = pos(Delim,Text,P+1)
 end
return C//2
IsASimpleCopy:
select
 when (word(CpyBefore,1) = 1 | word(CpyBefore,1) = 77) &,
    pos('.',CpyBefore) = 0
  then return 0
 when word(CpyAfter,1) = '.'
  then do
    CpyAfter = subword(CpyAfter,2)
    return 1
    end
 when word(CpyAfter,1) = 'OF'|word(CpyAfter,1) = 'IN'
  then do
    CpyAfter = subword(CpyAfter,2)
    if right(CopyAfter,1) = '.'
     then CpyAfter = '.' subword(CpyAfter,2)
     else CpyAfter = subword(CpyAfter,2)
    select
     when word(CpyAfter,1) = '.'
      then do
        CpyAfter = subword(CpyAfter,2)
        return 1
        end
     when word(CpyAfter,1) = 'SUPPRESS'|,
        word(CpyAfter,1) = 'SUPPRESS.'
      then do
        if right(CopyAfter,1) = '.'
         then CpyAfter = '.' subword(CpyAfter,2)
         else CpyAfter = subword(CpyAfter,2)
        select
         whe word(CpyAfter,1) = '.'
          then do
            CpyAfter = subword(CpyAfter,2)
            return 1
            end
         when word(CpyAfter,1) = 'REPLACING'
          then return 0
         when CpyAfter = ''
          then return 0
         otherwise
          return 0
          end
        end
     when word(CpyAfter,1) = 'REPLACING'
      then return 0
     when CpyAfter = ''
      then return 0
     otherwise
      return 0
```

TABLE 7-continued

EXPAND UTILITY

```
      end
    end
when
word(CpyAfter,1) = 'SUPPRESS'|word(CpyAfter,1) = 'SUPPRESS.'
  then do
    if right(CopyAfter,1) = '.'
      then CpyAfter = '.' subword(CpyAfter,2)
      else CpyAfter = subword(CpyAfter,2)
    select
      when word(CpyAfter,1) = '.'
        then do
          CpyAfter = subword(CpyAfter,2)
          return 1
        end
      when word(CpyAfter, 1) = 'REPLACING'
        then return 0
      when CpyAfter = ''
        then return 0
      otherwise
        return 0
      end
    end
  when word(CpyAfter,1) = 'REPLACING'
    then return 0
  when CpyAfter = ''
    then return 0
  otherwise
    return 0
  end
return 0
```

TABLE 8

MARK UTILITY

```
/* REXX mark preprocessed programs            */
/* Input: InpLib - Cobol programs Before preprocessing    */
/* Input: PreLib - Cobol programs After preprocessing   */
/* Output: OutLib - Cobol programs after marking     */
/* Output: RptLib - List of errors           */
/* Annotations:                      */
/* MARKA Before code that is not in the After code, commented out  */
/* MARKAC continuation of MARKA indicator field values   */
/* MARKB After code that is not in Before code, commented out   */
/* MARKBC continuation of MARKB indicator field values   */
/* MARKD After code that is not in Before code, as is    */
/* MARKE End of marked set                */
/* call to initalize variables */
/* call to get and validate arguments */
/* call to initalize report */
/* call to get the names of the input library members */
/* Process Before preprocessing members */
do Mem = 1 to MemCount
  /* call to get the input member */
  /* call to validate the output member name */
  if /* Pre member status */(InpMem.Mem) = 'MEMBER NOT FOUND'
    then do
      /* call to put the output member from the input member */
      /* call to add 'No After member' InpMem.Mem'; Before copied to
         Marked' to error report */
      iterate Mem
    end
  /* call to get the Pre member */
  /* Make sure both files end with identical lines */
  InpLine.0 = InpLine.0+1
  I = InpLine.0
  InpLine.I = copies('ff'x,80)
  PreLine.0 = PreLine.0+1
  I = PreLine.0
  PreLine.I = copies('ff'x,80)
  /* Create hash values to speed up the searches */
  /* call to hash the input member */
  /* call to hash the Pre member */
  /* Process the Before preprocessing member */
```

TABLE 8-continued

MARK UTILITY

```
  Inp = 0
  Pre = 0
  drop OutLine.
  Out = 0
  do while Inp < InpLine.0
    Inp = Inp+1
    Pre = Pre+1
    if left(InpLine.Inp,CompCols) == left(PreLine.Pre,CompCols)
      then do
        Out = Out+1
        OutLine.Out = InpLine.Inp
      end
    else do
      Out = Out+1
      MarkBInp = Inp
      MarkBPre = Pre
      MarkBOut = Out
      /* Find where they next match */
      do InpF = Inp to InpLine.0
        do PreF = Pre to PreLine.0
          if InpHash.InpF == PreHash.PreF
            then if left(InpLine.InpF,CompCols) ==,
                   left(PreLine.PreFCompCols)
              then leave InpF
        end
      end
      MarkEInp = InpF-1
      MarkEPre = PreF-1
      /* Save the indicator columns that will be overlayed */
      OutLine.Out = 'MARKA *'right(MarEInp-MarkBInp+1,4,'0')':'
      do L = MarkBInp to MarkEInp by 60
        do I = L to min(L+60-1,MarkEInp)
          OutLine.Out = OutLine.Out || substr(InpLine.I,7,1)
        end
        if I <= MarkEInp
          then do
            Out = Out+1
            OutLine.Out = 'MARKAC* :'
          end
      end
      /* Copy the preprocessor replaced lines and comment them out */
      do Out = Out+1 for MarkEInp-MarkBInp+1
        OutLine.Out = overlay('*',InpLine.Inp,7)
        Inp = Inp+1
      end
      /* Save the indicator columns that will be overlayed */
      OutLine.Out = 'MARKB *'right(MarkEPre-MarkBPre+1,4,'0')':'
      do L = MarkBPre to MarkEPre by 60
        do I = L to min(L+60-1,MarkEPre)
          OutLine.Out = OutLine.Out || substr(PreLine.I,7,1)
        end
        if I <= MarkEPre
          then do
            Out = Out+1
            OutLine.Out = 'MARKBC* : '
          end
      end
      /* Copy the preprocessor generated lines and comment them out */
      do Out = Out+1 for MarkEPre-MarkBPre+1
        OutLine.Out = overlay('*',PreLine.pre,7)
        Pre = Pre+1
      end
      /* Copy the preprocessor generated lines */
      OutLine.Out = 'MARKD *'right(MarkEPre-MarkBPre+1,4,'0')
      Pre = MarkBPre
      do Out = Out+1 for MarkEPre-MarkBPre+1
        OutLine.Out = PreLine.Pre
        Pre = Pre+1
      end
      OutLine.Out = 'MARKE *'
      Inp = MarkEInp
      Pre = MarkEPre
    end
  end
  OutLine.Out = ''
  Out = Out-1
  /* call to put the output member */
```

TABLE 8-continued

MARK UTILITY

```
  end
/* call to clean up for termination */
exit 0
```

TABLE 9

UNMARK UTILITY

```
/* REXX unmark marked programs                                        */
/* Input: InpLib - Cobol programs after marking                       */
/* Output: OutLib - Cobol programs after unmarking                    */
/* Output: ErrLib - Programs with errors, may be partially unmarked   */
/* Output: RptLib - List of errors                                    */
/* Annotations:                                                       */
/* MARKA Before code that is not in the After code, commented out     */
/* MARKAC continuation of MARKA indicator field values                */
/* MARKB After code that is not in Before code, commented out         */
/* MARKBC continuation of MARKB indicator field values                */
/* MARKD After code that is not in Before code, as is                 */
/* MARKE End of marked set                                            */
/* call to initalize variables */
/* call to get and validate arguments */
/* call to initalize report */
/* call to get the names of the input library members */
/* Process Marked members */
do Mem = 1 to MemCount
  call SayProgress
  /* call to get the input member */
  /* call to validate the output member name */
  /* call to validate the error member name */
  /* Process the Marked member */
  Inp = 0
  drop OutLine.
  Out = 0
  ErrOut = 0
  do while Inp < InpLine.0
    Inp = Inp+1
    if left(InpLine.Inp,4) = 'MARK' & left(InpLine.Inp,7) \= 'MARKA *'
      then ErrOut = 1
    if left(InpLine.Inp,7) = 'MARKA *'
      then do
        MarkAInp = Inp
        MarkAOut = Out
        InpErr = UnMarkSeg( )
        if InpErr > 0
          then do
            ErrOut = 1
            Inp = MarkAInp
            Out = MarkAOut
            Out = Out+1
            OutLine.Out = InpLine.Inp
            call RptError 'Error at' InpMem.Mem 'line' InpErr':', ,
                 InpLine.InpErr
          end
        end
        else do
          Out = Out+1
          OutLine.Out = InpLine.Inp
        end
      end
  Out = Out+1
  OutLine.Out = ''
  Out = Out-1
  if ErrOut
    /* call to put the error member */
    /* call to put the output member */
  end
/* call to clean up for termination */
exit 0
/* Program specific subroutines */
UnMarkSeg:
  /* Get all of the indicator column values */
  parse var InpLine.Inp 'MARKA *' ACount ':' AChars 73.
  if datatype(ACount,'w')
    then nop
    else return Inp
  do I = 61 to ACount by 60
    Inp = Inp+1
    if left(InpLine.Inp,7) = 'MARKAC*'
      then nop
      else return Inp
    parse var InpLine.Inp 'MARKAC*' . ':' ACharCont 73.
    AChars = AChars || ACharCont
  end
  /* Restore the original code */
  do A = Inp+1 to Inp+ACount
    Out = Out+1
    OutLine.Out = overlay(substr(AChars,A-Inp, 1),InpLine.A,7)
    if left(InpLine.A,4) = 'MARK'
      then return A
  end
  Inp = A
  /* Get the original preprocessor generated code, restored */
  if left(InpLine.Inp,7) = 'MARKB *'
    then nop
    else return Inp
  parse var InpLine.Inp 'MARKB *' BCount ':' BChars 73.
  if datatype(BCount,'w')
    then nop
    else return Inp
  do I = 61 to BCount by 60
    Inp = Inp+1
    if left(InpLine.Inp,7) = 'MARKBC*'
      then nop
      else return Inp
    parse var InpLine.Inp 'MARKBC*' . ';' BCharCont 73.
    BChars = BChars || BCharCont
  end
  drop PreLine.
  Pre = Inp+BCount+1
  do B = Inp+1 to Inp+BCount
    Pre = Pre+1
    PreLine.Pre = overlay(substr(BChars,B-Inp,1),InpLine.B,7)
    if left(InpLine.B,4) = 'MARK'
      then return B
  end
  Inp = B
  /* Get the active generated source and compare it to the original */
  if left(InpLine.Inp,7) = 'MARKD *'
    then nop
    else return Inp
  parse var InpLine.Inp 'MARKD *' DCount.
  if datatype(DCount,'w')
    then nop
    else return Inp
  if DCount = BCount
    then nop
    else return Inp
  EndD = Inp+DCount+1
  if left(InpLine.EndD,7) = 'MARKE *'
    then nop
    else return EndD
  do D = Inp+1 to EndD-1
    if InpLine.D == PreLine.D
      then nop
      else return D
  end
  Inp = D
return 0
```

TABLE 10

UNEXPAND UTILITY

```
/ REXX unexpand expanded copies and includes           */
/* Input: InpLib - Programs with copies/includes expanded inline    */
/* Output: OutLib - Programs with expanded copies/includes removed  */
/* Output: CpyLib - Copies/includes extracted from expanded programs */
```

TABLE 10-continued
UNEXPAND UTILITY

```
/* Output: RptLib - List of errors                            */
/* Annotations:                                               */
/* EXPBnn* Begin expansion for nesting level nn               */
/*   For -inc                                                 */
/*     col 8 -                                                */
/*     col 10–17 Member name                                  */
/*     col 19–22 Values from cols 7 and 1 in single quotes: '71'   */
/*   For ++include                                            */
/*     col 8 +                                                */
/*     col 10–17 Member name                                  */
/*     col 19–22 Values from cols 7 and 8 in single quotes: '78'   */
/*   For copy                                                 */
/*     col 8 C                                                */
/*     col 10–17 Member name                                  */
/*     col 19–.. Values from cols 7 from each statement line: '777'   */
/* EXPCnn Code added for nesting level nn that is not in copybook   */
/* EXPEnn* End expansion for nesting level nn                 */
/*     col 8 Type of include, as above                        */
/*     col 10–17 Member name                                  */
/*     col 19–62 Library data set name                        */
/* Internally used:                                           */
/* EXPRnn* start Restored and original lines                  */
/*     col 9–.. Input line number of EXPBnn*                  */
/*   restored line                                            */
/*   original line                                            */
/* EXPSnn* Stop restored and original lines                   */
/*     col 9–.. Input line number of last original line       */
/* call to initalize variables */
/* call to get and validate arguments */
/* call to initalize report */
/* call to get the names of the input library members */
/* Process input members */
do Mem = 1 to MemCount
  /* call to add the input member to the stack */
  /* call to validate the output member name */
  BadLine = VerifyInpMem( )
  if BadLine \= "
    then do
      /* call to add 'Bad Line; member not processed' to report */
      iterate Mem
    end
/* Process the input member */
address TSO "NEWSTACK"
ErrNest = 100
do Inp = 1 to InpLine.0
  select
    when left(InpLine.Inp,4) = 'EXPB'
      then do
        address TSO "NEWSTACK"
        parse var InpLine.Inp "EXPB" BNest "*" BType BName,
              "'" BInds "'"
        queue 'EXPR'BNest'*' Inp
        queue InpLine.Inp
        select
          when BType = '-'
            then do
              Inp = Inp+1
              queue right(BInds, 1)right(overlay(left(BInds,1), ,
                  InpLine.Inp,7),length(InpLine.Inp)-1)
              queue InpLine.Inp
            end
          when BType = '+'
            then do
              Inp = Inp+1
              queue overlay(BInds,InpLine.Inp,7)
              queue InpLine.Inp
            end
          when BType = 'C'
            then do
              Inp = Inp+1
              queue ' '
              queue InpLine.Inp
            end
          otherwise
        end
        queue 'EXPS'BNest'*' Inp
      end
    when left(InpLine.Inp,4) = 'EXPE'
      then do
        parse var InpLine.Inp "EXPE" ENest "*" EType EName EDSN.
        call HandleCpyMem EName
      end
    otherwise
      queue InpLine.Inp
  end
end
/* call to put the output member */
address TSO "DELSTACK"
end
/* call to clean up for termination */
exit 0
/* Program specific subroutines */
VerifyInpMem:
VLevel = 0
do V = 1 to InpLine.0
  if left(InpLine.V,3) = 'EXP'
    then do
      select
        when left(InpLine.V,4) = 'EXPB'
          then do
            parse var InpLine.V 'EXPB' VNest 7 VAst 8 VType VMem
                  VInd, 73.
            VInd = strip(VInd)
            if VAst \= '*' |verify(VType,'-+C') \= 0|,
               length(VMem) > 8 | length(VInd) <3|,
               left(VInd,1) \= "'"| right(VInd,1) \= "'"
              then return V 'improper EXPB line format'
            if \ datatype(VNest,'w')
              then return V 'EXPBnn, nn not a number'
            if VNest = 0
              then return V 'EXPB00, 00 not valid'
            VLevel = VLevel+1
            if VLevel \= VNest
              then return V 'EXPBnn, nn wrong nesting value'
          end
        when left(InpLine.V,4) = 'EXPE'
          then do
            parse var InpLine.V 'EXPE' VNest 7 VAst 8 VType VMem
                  VDSN, VRest 73.
            if VAst \= '*'| verify(VType,'-+C') \= 0|,
               length(VMem) > 8 |VRest \= "|,
               length(VDSN) < 11 |length(VDSN) > 46|,
               left(VDSN,1) \= "'"| right(VDSN,1) \= "'"
              then return V 'improper EXPE line format'
            if \ datatype(VNest,'w')
              then return V 'EXPEnn, nn not a number'
            if VNest = 0
              then return V 'EXPE00, 00 not valid'
            if VLevel \= VNest
              then return V 'EXPEnn, nn wrong nesting value'
            VLevel = VLevel-1
          end
        otherwise
          return V 'not EXPB or EXPE'
      end
    end
end
return "
HandleCpyMem:
arg CName
drop HeadLine.
do Head = 1 to queued( ) until left(HeadLine.Head,4) = 'EXPS'
  parse pull HeadLine.Head
end
parse var HeadLine.1 'EXPR' HNest '*' HInp
drop ExpLine.
do Exp = 1 to queued( )
  parse pull ExpLine.Exp
end
Exp = Exp-1
/* call to find the copy member */
if CpyFileOK = 'MEMBER NOT FOUND'
  then do
    /* call to put the copy member */
```

TABLE 10-continued

UNEXPAND UTILITY

```
    /* call to add 'Copybook added by program' InpMem.Mem to report */
    end
  else do
    /* call to get the copy member */
    /* Compare copy member with expanded */
    if CpyLine.0 = Exp
      then do
        do K = 1 to Exp while (CpyLine.K = ExpLine.K)
          end
        end
      else do
        K = Exp+1
        end
      if K <= Exp
        then do
          /* Report the mismatch */
          /* call to add 'Miscompare' to error report */
          if Unconditional = 'Y'
            then nop
            else ErrNest = HNest /* Leave it in the source */
          end
        end
address TSO "DELSTACK"
if ErrNest <= HNest
  then do
    ErrNest = ErrNest-1
    do S = 2 to Head-1 by 2
      queue HeadLine.S
      end
    do S = 1 to Exp
      queue ExpLine.S
      end
    queue InpLine.Inp
    end
  else do
    do S = 3 to Head-1 by 2
      queue HeadLine.S
      end
    end
return
```

Advantages over the Prior Art

It is an advantage of the invention that there is provided an improved system and method for changing source code.

It is a further advantage of the invention that there is provided an improved system and method for allowing remote compilations during source code change phase.

It is a further advantage of the invention that there is provided a system and method for allowing remote compilations during source code change phase, where those compilations are no more difficult than local compilations.

It is a further advantage of the invention that there is provided a system and method for changing and compiling source code at a remote station which does not have required preprocessors.

It is a further advantage of the invention that there is provided a system and method for processing source code which is compilable at both local and remote locations, with required preprocessing tools available only at the local location.

It is a further advantage of the invention that there is provided a system and method for updating or processing source code at a remote location which has been preprocessed into a form which can be compiled at the remote location and returning remotely updated or processed source code to the local location in a form.

Alternative Embodiments

It will be appreciated that, although specific embodiments of the invention have been described herein for purposes of illustration, various modifications may be made without departing from the spirit and scope of the invention. In particular, it is within the scope of the invention to provide a computer program product or program element, or a program storage or memory device such as a solid or fluid transmission medium, magnetic or optical wire, tape or disc, or the like, for storing signals readable by a machine, for controlling the operation of a computer according to the method of the invention and/or to structure its components in accordance with the system of the invention.

Further, each step of the method may be executed on any general computer, such as an IBM System 390, AS/400, PC or the like and pursuant to one or more, or a part of one or more, program elements, modules or objects generated from any programming language, such as C++, Java, P1/1, Fortran or the like. And still further, each said step, or a file or object or the like implementing each said step, may be executed by special purpose hardware or a circuit module designed for that purpose.

Under circumstances where only Cobol copy statements are used, the expand and unexpand steps may not be required.

Accordingly, the scope of protection of this invention is limited only by the following claims and their equivalents.

I claim:

1. A method for updating a language source file in a computer, comprising:

expanding and marking said source file to form an expanded marked source file compilable without reference to a tools source file, said expanding including using first comments in said source file identifying the placement of selectively inserted statements, and said marking including using second comments in said source file identifying and retaining original preprocessor code and preprocessor generated code;

processing said expanded marked source file to form a modified expanded marked source file selectively including processed preprocessor generated code; and unmarking and unexpanding said modified expanded marked source file to form a modified source file compilable with reference to said tools source file, said unmarking and unexpanding including comparing said processed preprocessor generated code and said preprocessor generated code and if match replacing said processed preprocessor generated code with said original preprocessor code.

2. The method of claim 1, said reference comprising at least one include statement.

3. The method of claim 1, said reference comprising at least one copy statement.

4. The method of claim 1, said modifying step being performed at a first system location remote from a second system location at which said expanding and marking step is performed, said tools source file not being available at said first system location.

5. A method for updating a computer language source file which contains references to a tools source file, comprising the steps of:

expanding said language source file with reference to said tools source file to form an expanded source file including expanded code;

marking said expanded source code to generate a marked expanded source file including marked expanded code, said marked expanded source file being compilable without further reference to said tools source file;

modifying said expanded marked source file to form a processed marked expanded source file;

unmarking said marked expanded code in said processed marked expanded source file to restore said expanded code; and unexpanding said expanded code to form a modified language source file including references to said tools source file.

6. System for compiling source code, comprising:

a remote host system having storage for a language source file and a tools source file;

a local system;

an expand component for expanding said language source file with reference to said tools source file to form an expanded source file including original preprocessor code and preprocessor generated code;

a mark component for marking said expanded source file to generate a marked expanded source file including comments distinguishing said original preprocessor code and said preprocessor generated code, said marked expanded source file being compilable without further reference to said tools source file;

said local system including a code component for processing said expanded marked source file to form a processed marked expanded source file selectively including processed preprocessor generated code;

an unmark component for unmarking said marked expanded code in said processed marked expanded source file to restore said expanded code by replacing said processed preprocessor generated code with said original preprocessor code upon said processed preprocessor generated code matching said processor generated code; and an unexpand component for unexpanding said expanded code to form a modified language source file including references to said tools source file.

7. A method of remotely changing and compiling software source code comprising the steps of:

moving source code and include files to separate libraries;

forming a set of expanded source files by expanding any include statements into expanded source code;

using identifier comments to distinguish said expanded include statements;

preprocessing said expanded source code;

forming a set of expanded preprocessed source files from preprocessed expanded source code;

comparing said expanded preprocessed source files to said expanded source files;

forming a set of marked source files by marking source statements that only appear in expanded processed source files as preprocessor source code and marking source statements that only appear in said expanded preprocessed source files as preprocessor generated code;

placing preprocessor source code in marked source files as comments and saving original values;

placing preprocessor generated code in marked source files as comments and saving original values to form marked preprocessed expanded source files;

processing said marked preprocessed expanded source files;

unmarking the processed marked preprocessed expanded source files;

unexpanding the unmarked processed marked preprocessed expanded source files;

resolving errors; and returning modified source code and include files to a home system.

8. A program storage device readable by a machine, tangibly embodying a program of instructions executable by a machine to perform method steps for updating a language source file, said method steps comprising:

expanding and marking said source file to form an expanded marked source file compilable without reference to a tools source file, said expanding including using first comments in said source file identifying the placement of selectively inserted statements, and said marking including using second comments in said source file identifying and retaining original preprocessor code and preprocessor generated code;

processing said expanded marked source file to form a modified expanded marked source file selectively including processed preprocessor generated code; and unmarking and unexpanding said modified expanded marked source file to form a modified source file compilable with reference to said tools source file, said unmarking and unexpanding including comparing said processed preprocessor generated code and said preprocessor generated code and if match replacing said processed preprocessor generated code with said original preprocessor code.

9. An article of manufacture comprising:

a computer useable medium having computer readable program code means embodied therein for updating a language source file, the computer readable program means in said article of manufacture comprising:

computer readable program code means for causing a computer to effect expanding and marking said source file to form an expanded marked source file compilable without reference to a tools source file, said expanding including using first comments in said source file identifying the placement of selectively inserted statements, and said marking including using second comments in said source file identifying and retaining original preprocessor code and preprocessor generated code;

computer readable program code means for causing a computer to effect modifying said expanded marked source file to form a modified expanded marked source file selectively including processed preprocessor generated code; and computer readable program code means for causing a computer to effect unmarking and unexpanding said modified expanded marked source file to form a modified source file compilable with reference to said tools source file, said unmarking and unexpanding including comparing said processed preprocessor generated code and said preprocessor generated code and if match replacing said processed preprocessor generated code with said original preprocessor code.

10. A computer program product for updating a language source file according to the method steps of:

expanding and marking said source file to form an expanded marked source file compilable without reference to a tools source file, said expanding including using first comments in said source file identifying the placement of selectively inserted statements, and said marking including using second comments in said source file identifying and retaining original preprocessor code and preprocessor generated code;

processing said expanded marked source file to form a modified expanded marked source file selectively including processed preprocessor generated code; and unmarking and unexpanding said modified expanded marked source file to form a modified source file compilable with reference to said tools source file, said unmarking and unexpanding including comparing said processed preprocessor generated code and said preprocessor generated code and if match replacing said processed preprocessor generated code with said original preprocessor code.

11. A method for operating a host system for updating a language source file, comprising the steps of:

expanding and marking said source file to form an expanded marked source file compilable without reference to a tools source file;

communicating said expanded marked source file to a remote work station;

receiving from said remote work station a modified expanded marked source file; and unmarking and unexpanding said modified expanded marked source file to form a modified source file compilable with reference to said tools source file.

12. A system for updating in a computer a software language source file, comprising:

an expand component for expanding said language source file with reference to a tools source file to form an expanded source file including expanded code;

a mark component for marking said expanded source code to generate a marked expanded source file including marked expanded code, said marked expanded source file being compilable without further reference to said tools source file;

a communications component for sending expanded marked source file to a remote location and for receiving a marked a processed marked expanded source file from said remote location;

an unmark component for unmarking said marked expanded code in said processed marked expanded source file to restore said expanded code; and an unexpand component for unexpanding said expanded code to form a modified language source file including references to said tools source file.

13. A method for updating a software language source file which contains copy statement references to a tools source file, comprising the steps of:

marking said source code to generate a marked source file including marked code, said marked source file being compilable without further reference to said tools source file;

modifying said marked source file to form a processed marked source file; and unmarking said marked code in said processed marked source file to form a modified language source file including references to said tools source file.

14. System for updating a language source file which contains copy statement references to a tools source file, comprising:

a mark component for marking said source code to generate a marked source file including marked code, said marked source file being compilable without further reference to said tools source file;

a workstation for modifying said marked source file to form a processed marked source file; and an unmark component for unmarking said marked code in said processed marked source file to form a modified language source file including references to said tools source file.

15. Method for updating computer source code, comprising:

expanding original preprocessor source code selectively including original copy statements and original insert statements into preprocessed generated code by using first comments in said source code to identify said include and copy statements;

preprocessing said source code into resulting code;

comparing said resulting code to said preprocessed generated code and using second comments in said source code to identify and retain in said source code original preprocessor code and preprocessor generated code;

processing said source code into processed preprocessor generated code;

comparing said processed preprocessor generated code and said original preprocessor code and, if match, replacing said processed preprocessor generated code with said original preprocessor source code, if no match, generating an error; and comparing expanded include and copy code with original code and, if match, replacing expanded include and copy code with said original include and said original copy statements and, if no match, generating an error.

* * * * *